| United States Patent Office | 3,202,644 |
|---|---|
| | Patented Aug. 24, 1965 |

3,202,644
SURFACE TREATED CARBON BLACK AS POLYMERIZATION CATALYST AND METHOD OF POLYMERIZATION THEREWITH
Joel A. Yancey, Wellesley, Mass., assignor to Cabot Corporation, Boston, Mass., a corporation of Delaware
No Drawing. Filed Dec. 11, 1964, Ser. No. 417,763
32 Claims. (Cl. 260—93.7)

This invention relates to the polymerization and copolymerization of α-mono- and di-olefins such as ethylene, propylene, butene-1, styrene, isoprene and butadiene, and includes within its scope novel catalysts for such polymerization reactions.

This application is a continuation in part of U.S. Serial No. 32,588, filed May 31, 1960, now abandoned; U.S. Serial No. 218,117, filed, August 20, 1962 now abandoned; and U.S. Serial No. 227,567, filed October 1, 1962, now abandoned, all by Joel A. Yancey.

It is a principal object of the present invention to provide novel catalysts for polymerizing α-mono- and di-olefins, and mixtures thereof.

Another object of the present invention is to provide a novel process for polymerizing α-mono- and di-olefins and mixtures thereof.

Other objects of the present invention will in part be obvious and will in part appear hereinafter.

In accordance with the present invention, α-mono- and di-olefins, preferably those containing not over 8 carbon atoms, are polymerized or copolymerized by catalysts comprising (a) the product of the reaction between a compound of a metal chosen from the group consisting of the metals of Groups IIb and IIIb (where the group numbers correspond to the Mendeleev Periodic Table) and the hydroxyl groups on the surface of finely-divided carbon black, and preferably channel black, (b) a halide-type compound of Groups IVa, Va, VIa, VII or period 4 of Group VIII metal. The polymerization or copolymerization reaction can be effected at suitable temperatures within the range from about −25° C. to about 250° C., and pressures ranging from below atmospheric upwardly to any desired maximum pressure, for example, 30,000 p.s.i.g. or even higher pressures.

Carbon blacks suitable for the purposes of the present invention generally include any carbon black with hydroxyl groups on the surface thereof. For example, many channel carbon blacks and furnace carbon blacks are suitable for the purposes of the present invention. Definitely preferred, however, are those finely-divided carbon blacks having a hydroxyl group content on the surface thereof of above about 0.1 and most preferably above about 0.5 milliequivalent per gram.

Compounds of metals of Groups IIb and IIIb (hereinafter referred to as "organometallic compounds") suitable for the purposes of the present invention are any of the compounds conforming to the empirical formula:

$$MM'_vX_nR_y$$

wherein M is chosen from the metals of Groups IIb and IIIb; M' is a metal of Group I; $v$ is a number from 0 to 1; each X is any halogen; $n$ is a number from 0 to 2; each R is any monovalent hydrocarbon or hydride radical; and $y$ is a number from 2 to 4.

Specific examples of R groups for substitution in the above formula include methyl, isobutyl, hexyl, n-dodecyl, 2-methyl-2-butenyl, cyclohexylethyl, methylcyclopentylethyl, 4-cyclohexenylethyl, 2-phenylethyl, methylnaphthylethyl, 2,2,1-bicycloheptyl, dimethylcyclopentyl, dimethylcyclohexyl, isopropylcyclohexyl, 5 - cyclopentadienyl, phenylcyclopentyl, phenyl, tolyl, ethylphenyl, dimethylnaphthyl, cyclohexylphenyl and the like.

Specific examples of compounds conforming to the above formula and which are therefore suitable for the purposes of the present invention are dimethyl zinc—$(CH_3)_2Zn$; diethyl zinc—$(C_2H_5)_2Zn$; ethyl n-propyl zinc—$C_2H_5Zn$-n-$C_3H_7$; di-n-propyl zinc—$(n-C_3H_7)_2Zn$; di-isopropyl zinc—$(i-C_3H_7)_2Zn$; ethyl isobutyl zinc—

$C_2H_5Zn$-i-$C_4H_9$;

n-propyl isobutyl zinc—n-$C_3H_7Zn$-i-$C_4H_9$; di-n-butyl zinc—$(n-C_4H_9)_2Zn$; di-isobutyl zinc—$(i-C_4H_9)_2Zn$; isobutyl-isoamyl zinc—i-$C_4H_9Zn$-i-$C_5H_{11}$; di-isoamyl zinc—$(i-C_5H_{11})_2Zn$; diphenyl zinc—$(C_6H_5)_2Zn$; di-o-tolyl zinc—$(o-CH_3C_6H_4)_2Zn$; di-β-naphthyl zinc—$(β-C_{10}H_7)_2Zn$; dimethyl cadmium—$(CH_3)_2Cd$; diethyl cadmium—$(C_2H_5)_2Cd$; di-n-propyl cadmium—$(n-C_3H_7)_2Cd$; di-n-butyl cadmium—$(n-C_4H_9)_2Cd$; di-isobutyl cadmium—$(i-C_4H_9)_2Cd$; di-isoamyl cadmium—$(i-C_5H_{11})_2Cd$; diphenyl cadmium—$(C_6H_5)_2Cd$; dimethyl mercury—$(CH_3)_2Hg$; di-o-biphenyl mercury—$(o-C_6H_5C_6H_4)_2Hg$; di-isopropyl mercury—$(i-C_3H_7)_2Hg$; methyl penyl mercury—$CH_3HgC_6H_5$; di-n-butyl mercury—$(n-C_4H_9)_2Hg$; di-t-butyl mercury—$(t-C_4H_9)_2Hg$; di-isoamyl mercury—$(i-C_5H_{11})_2Hg$; dicyclohexyl mercury—$(_6H_{11})Hg$; di-m-tolyl mercury—$(m-CH_3C_6H_4)_2Hg$; diheptyl mercury—$(C_7H_{15})_2Hg$; diphenylethyl mercury—

$(C_6H_5CH_2CH_2)_2Hg$ di-o-xylyl mercury—$[o-(CH_3)_2C_6H_3]_2Hg$; di-p-xylyl mercury—$[p-(CH_3)_2C_6H_3]_2Hg$; di - 2 - ethylhexyl mercury—

$$[CH_3CH_2CH_2CH_2CHCH_2]_2Hg$$
$$\underset{C_2H_5}{|}$$

2,4,5-dimesityl mercury—$[2,4,5-(CH_3)_3C_6H_2)]_2Hg$; dipropylphenyl mercury—$[(C_3H_7)_2C_6H_3]_2Hg$; di-α-naphthyl mercury—$(α-C_{10}H_7)_2Hg$; tri-i-butylborine—

$(i-C_4H_9)_3B$ dimethyl iodoborine—$(CH_3)_2BI$; tetraborane—$B_4H_{10}$; tetramethyl diborane—$H(CH_3)_2BB(CH_3)_2H$; tri-i-amyl borine—$B(i-C_5H_{11})_3$; 1,1,2-trimethyl diborane—

$H(CH_3)_2BB(CH_3)H_2$ tri-n-propylborine—$(n-C_3H_7)_3B$; trihexylborine—

$(C_6H_{13})_3B$ monoiododiborane—$H_3BBH_2I$; trimethylgalline—

$Ga(CH_3)_3$ tetramethyl digalline—$(CH_3)_2GaGa(CH_3)_2$; triethylgalline—$Ga(C_2H_5)_3$; dimethylchlorogalline—$(CH_3)_2GaCl$; dimethyl tetrahydroborino galline—$(CH_3)_2GaBH_4$; digallane—$H_3GaGaH_3$; trimethyl indine—$In(CH_3)_3$; tripropyl indine—$In(C_3H_7)_3$; dibenzylbromothalane—

$(C_6H_5CH)_2TlBr$ trimethyl thallane—$(CH_3)_3Tl$; tri-i-butyl thallane—$(i-C_4H_9)_3Tl$; lithium tetraethylalumium—$(C_2H_5)_4LiAl$; lithium tetrahexylaluminum—$(C_6H_{11})_4LiAl$; potassium trioctylalumium fluoride—$(C_8H_{17})_3KAlF$; lithium triethylaluminum bromide—$(C_2H_5)_3LiAlBr$; diisobutylaluminum chloride—$(i-C_4H_9)_2AlCl$; and diisobutylalumimum hydride—$(i-C_4H_9)_2AlH$; and in particular the pure aluminum alkyls, such as trihexylaluminum—$(C_6H_{13})_3Al$; triethylaluminum—$(C_2H_5)_3Al$; trimethylaluminum—

$(CH_3)_3Al$ and triisobutylaluminum—$(i-C_4H_9)_3Al$.

Although it is appreciated that when all of the R's present in the above-defined empirical formula are hydride radicals, the resulting compound is not normally termed an organometallic compound, compounds lacking at least one hydrocarbon radical comprise such a relatively small number of the total number of compounds included by said formula that for the purposes of the present invention, it is most convenient and not illogical that these compounds be included within the generic term, "organometallic compound." Accordingly, in the specification and in the claims, it is intended, and therefore it should be understood, that the term, "organometallic compound," refers to all the compounds included within the scope of the above-defined empirical formula.

The conditions under which reaction between the organometallic compound and the carbon black can be accomplished are subject to considerable variation. However, in order to obtain a catalyst component with exceptionally high activity and reproducible character and performance, it has been found to be all important that the carbon black be essentially dry and anhydrous (i.e., free of molecular water in any form) at the time it is brought into contact with the organometallic compound. If the carbon black to be utilized contains molecular water in any form and/or tends to absorb same on exposure to humid atmospheres, etc., it must be dried immediately before use, or, after drying must be maintained continuously out of contact with water vapor until utilized. If the precaution of using a substantially anhydrous carbon black is not observed, the desired chemical reaction either does not occur at all or does not predominate to the extent necessary to produce a superior catalyst component. Instead, products are obtained which are either totally inactive as catalyst components or are very inferior as catalyst components, in that (a) less polymer per gram of catalyst is produced and (b) reaction rates for production of polymer are lower.

Generally, the reaction can be carried out by contacting the carbon black with an organometallic compound, preferably a solution thereof in an inert hydrocarbon medium, and maintaining the two reactants in intimate contact for a period of time sufficient to effect the desired chemical reaction resulting in the chemical bonding of the organometallic compound to the carbon black. The length of time required to effect a given amount of such reaction and chemical bonding is largely dependent upon the temperature of the reaction mixture.

Generally speaking, any temperature between about 0° C. and 100° C. can be used satisfactorily, but room temperature or higher will generally be used. Assuming provision is made for intimate contact of the dry carbon black and the organometallic compound, the time required to accomplish the chemical reaction needed will vary from periods of the order of one minute at temperatures of about 100° C. or higher, to periods of the order of 20 minutes at temperatures of about 10–20° C. Temperatures substantially higher than about 100° C., e.g. 150–175° C., often cause the decomposition of the organometallic compound and, moreover, are normally completely needless; hence, are of little or no interest.

Although use of the organometallic compound in solution form gives excellent results, reaction of the organometallic compound with the carbon black can also be effected if the latter is exposed to sufficient quantities of the vapors of an organometallic compound under conditions of time and temperature similar to those discussed above. Said vapors can be supplied under their own vapor pressures using a partial vacuum if necessary, or with the aid of a dry, inert carrier gas such as nitrogen. This vapor phase treatment can be accomplished in any suitable manner such as by circulating the vapors through the carbon black in a fixed, moving or fluidized bed reactor.

The accomplishment of an actual chemical reaction of controlled extent between the carbon black and the organometallic compound is of utmost importance in obtaining the exceptionally active and efficient catalyst components described in this invention, i.e. the grams of polymer producible per gram of catalyst employed is generally highly dependent upon the amount of organometallic compound chemically combined with a given weight of carbon black. Accordingly, in preparing the surface reacted carbon blacks of the present invention, it should be kept in mind that the smaller the average particle size of the carbon black and the larger the quantity of hydroxyl groups on the surface thereof, the greater will be the potential activity and efficiency of the resulting catalyst component producible therefrom. Therefore, it is important to use as the starting material, particulate carbon black having an average particle diameter of less than about 1 micron, and preferably less than about 0.1 micron, and a substantial hydroxyl group content on the surface thereof. Accordingly, channel blacks and certain furnace blacks are greatly preferred because they are available in average particle diameters of less than about 0.5 micron and preferably substantially less than about 0.1 micron, and have a relatively large concentration of hydroxyl groups on the surface thereof.

In short, to reduce this discussion of extent of reaction between the carbon black and the organometallic compounds to the simplest possible terms, it is believed that the surface reacted carbon black can best be described and specified as follows: Preferred for imparting optimum catalytic activity and providing maximum catalyst efficiencies when used with a given transition metal halide in a given system are those carbon blacks which have at least about $1 \times 10^{-4}$ gram atoms of a metal of Group IIb or IIIb chemically linked to the surface thereof per gram of said black. Still quite useful and practical, however, particularly when amounts of 1 part or more by weight of the solid per 100 parts of polymer are desired in the final polymerization product, are those surface reacted carbon blacks which contain as little as $1 \times 10^{-5}$ gram atoms of a metal of Group IIb or IIIb chemically combined to the surface thereof per gram of black. Although the mechanism of the reaction between the organometallic compound and the carbon black is not completely understood, it is known that the organometallic compound reacts with the hydroxyl groups on the surface of the carbon black liberating by-products such as the corresponding alkane when an alkyl radical reacts, or hydrogen when a hydride radical reacts. It is believed that the type of reaction that occurs is correctly illustrated by the following illustrative equations wherein triethylaluminum, diethylaluminum chloride, diethyl zinc and lithium tetraethylaluminum serve as the organometallic compounds that are reacted with the carbon black:

EQUATION 1

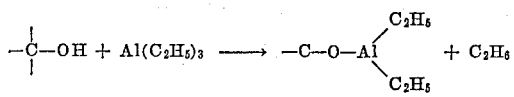

EQUATION 2

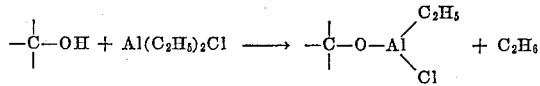

EQUATION 3

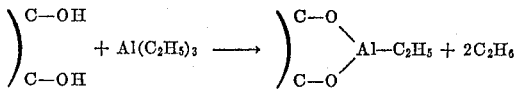

EQUATION 4

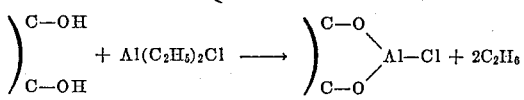

EQUATION 5

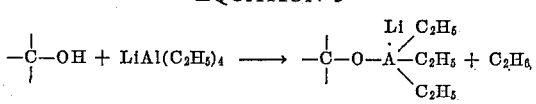

EQUATION 6

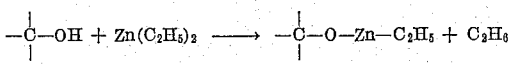

It is pointed out that in order to obtain a catalyst component of the highest possible activity, aside from observing the aforementioned important precautions and reaction conditions, it is also recommended that the quantity of organometallic compound with which the carbon black is contacted be at least approximately sufficient to react with all the active hydroxyl groups present, since those left unreacted might deactivate a portion of the transition metal halide component of the catalyst which will be added subsequently. In addition, it is necessary that sufficient organo- Group IIb or IIIb metal be attached to the surface of the carbon black to react or complex with the transition metal compound to be added subsequently, and to sustain the polymerization reaction. Accordingly, as the above equations tend to illustrate, it is generally necessary to provide at least one molecule of a trialkyl organometallic compound for every two hydroxyl groups, or one molecule of a dialkyl organometallic compound for each hydroxyl group, on the surface of the carbon black.

Moreover, it is generally desirable to use more than these minimum amounts of the organometallic compounds and to restrict the reaction temperatures to less than about 100° C. in order to favor the reactions typified by Equations 1, 5 and 6 over those illustrated by Equations 3 and 4, because the products of Equation 2 tend to be less active as catalyst components than those of Equations 1 and 5 while products of Equation 4 are normally totally inactive as catalyst components in the polymerization of α-mono- and di-olefins, as are those from Equation 7 below since no organo-metal is present on the surface of the resultant products.

EQUATION 7

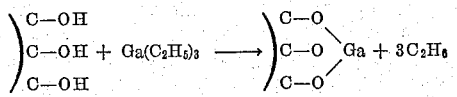

On the other hand, if more organometallic compound is introduced than will react under the reaction conditions used, the excess is preferably removed before formation of the complete polymerization catalyst. Although the excess can be removed by extraction, it is obviously more desirable to avoid additional steps.

It is pointed out that if organometallic dihalides or other compounds containing only one R group per molecule are utilized, active catalyst components cannot normally be produced because the alkyl radical preferentially reacts with the hydroxyl groups on the surface of the carbon black to produce a product typified by Equation 8 below:

EQUATION 8

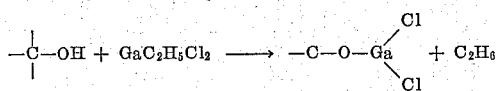

The halide-type compounds (hereinafter generally referred to as transition metal halides) which are suitable for use as the other component of the finished polymerization catalyst of the present invention are the compounds conforming to the empirical formula:

$$TO_aX_b$$

wherein T is a metal of Groups IVa, Va, VIa, VIIa or period 4 of Group VIII of the periodic table; O is oxygen; $a$ is a number from 0 to 2; each X is any halogen; and $b$ is a number from 1 to 7.

Examples of suitable compounds conforming to the empirical formula are halides of Group IVa, Va, VIa, VIIa and period 4 of Group VIII metals such as titanium tetrachloride, zirconium tetrachloride, titanium trichloride, vanadium tetrachloride, titanium tetraiodide, chromium trichloride, chromium tribromide, manganese dichloride, molybdenum hexachloride, ferric triiodide and cobaltous chloride and oxyhalides of said metals, such as vanadium oxychloride and chromic oxychloride.

Using the catalyst of this invention, polymerization of the olefinic charging stock can be accomplished in the absence of liquids, solvents or diluents, for example, in the gas phase, but it is usually easier to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butanes, n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like are suitable. Also members of the aromatic hydrocarbon series, such as ethylbenzene, isopropylbenzene, 2-butylbenzene, t-butylbenzene, ethyltoluene, ethylxylenes, hemimellitene, pseudocumene, isodurene, diethylbenzenes, isoamylbenzene, and particularly the mononuclear aromatic hydrocarbons such as benzene, toluene, xylenes, mesitylene and xylene-p-cymene mixtures and the like are completely suitable. Aromatic hydrocarbon fractions obtained by the selective extraction of aromatic naphthas, from hydro-forming operations such as distillates or bottoms, from cycle stock fractions or cracking operations, etc., and certain alkyl naphthalenes which are liquid under the polymerization reaction conditions, for example, 1-methylnaphthalene, 2-isopropylnaphthalene, 1-n-amyl-naphthalene and the like, or commercially produced fractions containing these hydrocarbons and the like are also suitable. Satisfactory liquid reaction media can also be composed of mixtures of aromatic and paraffinic fractions which are individually suitable.

The proportion of surface reacted carbon black to transition metal halide utilized in preparing the finished catalyst is not usually a critical feature of the process. Moreover, if this proportion is expressed as a simple molar or weight ratio, it may not be particularly meaningful because as indicated above, the efficiency of said surface reacted carbon blacks (on a weight or molar basis) is highly dependent upon the proportion of organo- Group IIb or IIIb metal chemically attached thereto. Accordingly, in order to be most meaningful the relationship between amounts of the two components of the finished catalyst should be expressed as some function of the amount of metal which is chemically attached to the surface of the carbon black. We have found from experience that an atomic ratio of from 0.1 to 2 and preferably 0.3 to 1.4 of the transition metal to organo- Group IIb or IIIb metal chemically attached to the surface of the carbon black is desirable.

The quantity of catalyst, i.e., comprising both the surface reacted carbon black and the transition metal halide to be utilized in the polymerization reaction may vary, the precise quantity selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when (a) a very fine particle size carbon black has been utilized and (b) the organometallic compound carbon black reaction has been conducted in such a manner as to leave more than one organo-radical attached to most of the metal atoms on the surface of the carbon black.

Harmful impurities in the liquid hydrocarbon reaction medium can be effectively neutralized prior to the formation therein, or addition thereto, of the catalyst or catalyst components of this invention by treating the liquid medium with a metal alkyl or a transition metal compound. The olefinic charging stocks can also be purified by any known means such as bubbling said stocks through a solution of a metal alkyl in a hydrocarbon solvent prior to their introduction into the polymerization reactor.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can, in turn, be cooled by indirect heat exchange with a suitable coolant inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative, non-limiting examples:

Example 1

To an 8 ounce bottle there is added 4 grams of "Super-carbovar," a channel carbon black produced by Cabot Carbon Company which has been treated with ozone at a temperature of about 25° C. for about 20 hours, has an average particle diameter of about 14 millimicrons and a hydroxyl group content on the surface thereof of about 1.6 milliequivalents per gram. Said bottle is then placed in a vacuum drying oven heated to a temperature of about 110° C. for about twelve hours. Subsequently, the bottle is sealed with a self-sealing rubber gasket without exposing said carbon black to the atmosphere and the bottle is evacuated and filled with nitrogen. 200 milliliters of isooctane and 4.8 millimoles of triisobutylaluminum are charged to said bottle under a nitrogen atmosphere. The bottle is then continuously shaken, and maintained at about room temperature for a period of 30 minutes. Subsequently, the extent of the reaction between the triisobutylaluminum and the carbon black is determined by testing the liquid contents of the bottle for aluminum alkyl. None is found in the liquid while analysis of the carbon black phase shows that 4.8 milligram atoms of alkylated aluminum are chemically bound to the surface of the carbon black. An aliquot containing 1 gram of carbon black and 1.2 milligram atoms of alkylated aluminum is then transferred without exposure to the atmosphere from this bottle to a 500 milliliter, three neck, glass reaction vessel which has been previously flushed with dry nitrogen. 50 milliliters of isooctane are then charged to this vessel and the vessel is saturated with ethylene. Next, 0.8 millimole of titanium tetrachloride are added and the contents of said reaction vessel are continuously and vigorously stirred, and ethylene is continuously swept through the reaction vessel at a rate somewhat faster than its consumption for about 3 hours. The reaction products are analyzed and it is found that 40 grams of polyethylene which has a density of about 0.96 has been produced. The polymer product is a powdery material and is found to have a crystalline melting point of about 130° C. It is further found that none of the ethylene has been converted to a normally liquid product.

Example 2

This example is a duplicate of Example 1, except that the carbon black is not dried prior to treatment with the triisobutylaluminum. After the 30 minute treatment with triisobutylaluminum is completed, an aliquot containing 1 gram of carbon black is transferred to a reaction vessel and a polymerization reaction as set forth in Example 1 is then conducted. The products from the polymerization reaction are analyzed and it is found that less than 1 gram of polyethylene has been produced.

Example 3

To an 8 ounce bottle there is added 5 grams of "Super-carbovar" channel carbon black. Said bottle is then placed in a vacuum drying oven heated to a temperature of about 110° C. for about twelve hours. Subsequently, the bottle is sealed with a self-sealing rubber gasket without exposing said carbon black to the atmosphere and the bottle is evacuated and filled with nitrogen. 200 milliliters of benzene and 6 millimoles of triethylaluminum are charged to said bottle under a nitrogen atmosphere. The bottle is then continuously shaken and maintained at about room temperature for a period of 35 minutes. Subsequently, the extent of the reaction between the triethylaluminum and the carbon black is determined by testing the liquid contents of the bottle for aluminum alkyl. None is found in the liquid while analysis of the carbon black phase shows that 6 milligram atoms of alkylated aluminum are chemically bound to the surface of the carbon black. An aliquot containing 1 gram of carbon black and 1.2 milligram atoms of alkylated aluminum is then transferred without exposure to the atmosphere from this bottle to a 500 milliliter, three neck, glass reaction vessel which has been previously flushed with dry nitrogen. 60 milliliters of benzene are then charged to this vessel and the vessel is saturated with propylene. Next 0.7 millimole of zirconium tetrabromide is added and the contents of said reaction vessel are continuously and vigorously stirred, and propylene is continuously swept through the reaction vessel at a rate somewhat faster than its consumption for about 3 hours. The reaction products are analyzed and it is found that 10 grams of polypropylene which has a density of about 0.88 and a crystalline melting point of about 172° C. has been produced.

Example 4

To an 8 ounce bottle there is added 10 grams of "Vulcan 9," a furnace carbon black produced by Cabot Carbon Company, and having an average particle size of about 20 millimicrons and a hydroxyl group content on the surface thereof of about 0.1 milliequivalent per gram. Said bottle is then placed in a vacuum drying oven heated to a temperature of about 110° C. for about twelve hours. Subsequently, the bottle is sealed with a self-sealing rubber gasket without exposing said carbon black to the atmosphere and the bottle is evacuated and filled with nitrogen. 200 milliliters of benzene and 1 millimole of lithium tetraoctylaluminum are charged to said bottle under a nitrogen atmosphere. The bottle is then continuously shaken and maintained at about room temperature for a period of 40 minutes. Subsequently, the extent of the reaction between the lithium tetraoctylaluminum and the carbon black is determined by analyzing the contents of the bottle. No aluminum alkyl is found in the liquid, while analysis of the carbon black phase shows that 1 milligram atom of alkylated aluminum is chemically bound to the surface of the carbon black. Said carbon black is then transferred without exposure to the atmosphere from this bottle to a 12 ounce "pop" bottle which has been previously flushed with dry nitrogen. The bottle is saturated with butadiene. Next, 0.12 millimole of vanadium oxychloride and 20 grams of butadiene are injected into the bottle which is then rotated end-over-end for about 5 hours at room temperature. The reaction products are analyzed and it is found that 10 grams of polybutadiene has been produced.

*Example 5*

To an 8 ounce bottle previously flushed with nitrogen there is added 6 grams of "Carbolac 2," a channel carbon black produced by Cabot Carbon Company, and having an average particle diameter of about 12 millimicrons and a hydroxyl group content of about 1 milliequivalent per gram. Said bottle is then placed in a vacuum drying oven heated to a temperature of about 110° C. for above twelve hours. Subsequently, the bottle is sealed with a self-sealing rubber gasket without exposing said carbon black to the atmosphere, and there are charged to said bottle 5 millimoles of dibutylaluminum hydride and 200 milliliters of benzene. The bottle is then continuously shaken and maintained at about room temperature for a period of 45 minutes. Subsequently, the extent of the reaction between the dibutylaluminum hydride and the carbon black is determined by testing the liquid contents of the bottle for aluminum alkyl. None is found in the liquid, while analysis of the carbon black phase shows that 5 milligram atoms of alkylated aluminum are attached to the surface of the carbon black. An aliquot containing 2 grams of carbon black, and 1.67 milligram atoms of alkylated aluminum is then transferred without exposure to the atmosphere from this reaction bottle to a 12 ounce "pop" bottle which has been previously flushed with dry nitrogen and fitted with a self-sealing rubber cap. 40 milliliters of benzene are then charged to this second bottle and the bottle is saturated with liquid butene-1. Next, 0.9 millimole of chromium trichloride complexed with tetrahydrofuran in order to increase its solubility in benzene and 20 grams of liquid butene-1 are added and the contents of said second reaction bottle are continuously rotated end-over-end for about 4 hours at room temperature. The reaction products are analyzed and it is found that 12 grams of polybutene have been produced.

*Example 6*

To an 8 ounce bottle there is added 10 grams of "Vulcan 9" carbon black. Said bottle is then placed in a vacuum drying oven heated to a temperature of about 110° C. for about twelve hours. Subsequently, the bottle is sealed with a self-sealing rubber gasket without exposing said carbon black to the atmosphere, and there are charged to said vessel 1 millimole of dihexylaluminum bromide and 100 milliliters of benzene. The bottle is then continuously shaken and maintained at about room temperature for a period of 50 minutes. Subsequently, the extent of the reaction between the dihexylaluminum bromide and the carbon black is determined by testing the liquid contents of the bottle for aluminum alkyl. None is found in the liquid, while the carbon black is found to have 1 milligram atom of alkylated aluminum attached to the surface thereof. Said carbon black is then transferred without exposure to the atmosphere from this bottle to a 1 liter stirred autoclave which has been previously flushed with dry nitrogen. 200 milliliters of benzene is then charged to the autoclave and the autoclave is saturated with ethylene. Next, 0.7 millimole of manganese dichloride, 20 grams of liquid propylene, 20 grams of ethylene, and 10 grams of butadiene are added, and the contents of the autoclave maintained at a temperature of about 50° C. while being continuously and vigorously stirred for about 25 hours. The reaction products are analyzed and it is found that 45 grams of a terpolymer have been produced.

*Example 7*

To a 12 ounce bottle previously flushed with nitrogen there is added 6 grams of "Carbolac 2" carbon black. Said bottle is then placed in a vacuum drying oven heated to a temperature of about 110° C. for about twelve hours. Subsequently, the bottle is sealed without exposing said carbon black to the atmosphere, and there are charged to said bottle 5 millimoles of potassium trioctylaluminum fluoride and 200 milliliters of benzene. The bottle is then continuously shaken and maintained at about room temperature for a period of 45 minutes. Subsequently, the extent of the reaction between the potassium trioctylaluminum fluoride and the carbon black is determined by testing the liquid contents of the bottle for aluminum alkyl. None is found in the liquid, while the carbon black is found to have 5 milligram atoms of alkylated aluminum attached to the surface thereof. An aliquot containing 2 grams of carbon black and about 1.7 milligram atoms of alkylated aluminum is then transferred without exposure to the atmosphere from this bottle to a 12 ounce "pop" bottle which has been previously flushed with dry nitrogen. 120 milliliters of benzene and 50 grams of liquid styrene are then charged to the bottle. Next, 1 millimole of ferric bromide is added and the contents of said bottle are maintained at a temperature of about 30° C. while being continuously rotated end-over-end for about 6 hours. The reaction products are analyzed and it is found that 29 grams of polystyrene have been produced.

*Example 8*

To a 12 ounce bottle which has been previously flushed with dry nitrogen there is added 4 grams of the "Supercarbovar" carbon black utilized in Example 1. Said bottle is then placed in a vacuum drying oven heated to a temperature of about 110° C. for above twelve hours. Subsequently, the bottle is sealed without exposing said carbon black to the atmosphere, and there are charged to said bottle 4.8 millimoles of trimethylaluminum and 200 milliliters of isooctane. The bottle is then continuously shaken and maintained at about room temperature for a period of 45 minutes. Subsequently, the extent of the reaction between the trimethylaluminum and the carbon black is determined by testing the liquid contents of the bottle for aluminum alkyl. None is found in the liquid, while analysis of the carbon black phase shows that 4.8 milligram atoms of alkylated aluminum are attached to the surface of the carbon black. An aliquot containing 2 grams of carbon black and 2.4 milligram atoms of alkylated aluminum is then transferred without exposure to the atmosphere from this bottle to a 425 cc. stainless steel bomb which has been previously flushed with dry nitrogen. 1.2 millimoles of titanium tetrachloride are then charged to the bomb together with 20 grams of ethylene, 10 grams of liquid isoprene, and 10 grams of liquid butadiene and the contents of said bomb are continuously rotated end-over-end in a 50° C. bath for about 8 hours. The reaction products are analyzed and it is found that 20 grams of a terpolymer of ethylene, isoprene and butadiene have been produced.

*Example 9*

To a 12 ounce bottle which has been previously flushed with dry nitrogen is added 4 grams of the "Carbolac 2." Said bottle is then placed in a vacuum drying oven heated to a temperature of above 110° C. for about twelve hours. Subsequently, the bottle is sealed without exposing said carbon black to the atmosphere, and there are charged to said bottle 3.6 millimoles of diethyl zinc and 200 milliliters of isooctane. The bottle is then continuously shaken and maintained at about room temperature for a period of one hour. Subsequently, the extent of the reaction between the diethyl zinc and the carbon black is determined by testing the liquid contents of the bottle for diethyl zinc. None is found in the liquid, while analysis of the carbon black phase shows that 3.6 milligram atoms of alkylated zinc are attached to the surface of the carbon black. An aliquot containing 2 grams of carbon black and 1.8 milligram atoms of alkylated zinc is then transferred without exposure to the atmosphere from this bottle to a 425 cc. stainless steel bomb which has been previously flushed with dry nitrogen. 1.2 millimoles of titanium tetrachloride are then charged to the bomb together with 30 grams of ethylene and the contents of said bomb are continuously rotated end-over-end in a 60° C. bath for about 10 hours. The reaction products are analyzed and it is found that 28 grams of polyethylene have been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as silicas and additional carbon black, extenders, plasticizers, pigments, insecticides, fungicides, etc., can be incorporated into the said polymers.

Also, the polymers produced by the process of the present invention, especially the polymers having high specific viscosities can be blended with the lower molecular weight polymers to impart stiffness or other desired properties thereto. The solid resinous products produced by the process of the present invention can, likewise, be blended in any desired proportions with hydrocarbon oils, waxes, with high molecular weight polybutylenes, and with other organic materials.

The polymer produced by the present process can also be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers produced by our invention can also be crosslinked to effect increases in softening temperatures, etc.

Obviously, many changes can be made in the above described examples and procedure without departing from the scope of the invention. For example, transition metal compounds other than those mentioned above are also suitable for the purposes of the present invention. Also finely-divided carbon blacks other than those specifically mentioned above are suitable for the purposes of the present invention.

Also, although not specifically disclosed heretofore, it it obvious that carbon blacks reacted with mixtures of individually suitable organometallic compounds, and mixtures of individually suitable transition metal compounds are both also suitable for the purposes of the present invention.

Accordingly, it is intended that the above disclosure be regarded as illustrative and as in no way limiting the scope of the invention.

What I claim is:
1. A catalyst which comprises
   (a) carbon black having an average particle diameter of less than about 0.1 micron and having chemically linked directly to oxygen atoms in the surface thereof at least about $1 \times 10^{-4}$ equivalents per gram of structures conforming to the formula:

$$MM'_v X_n R_y$$

wherein M is chosen from the group consisting of the metals of Groups IIb and IIIb (where the group numbers correspond to the Mendeleev Periodic Table); M' is a metal of Group I; $v$ is a number from 0 to 1; each X is any halogen; $n$ is a number from 0 to 2; each R is chosen from the group consisting of hydride and monovalent hydrocarbon radicals; and $y$ is a number from 1 to 3; and
   (b) a compound conforming to the general formula:

$$TO_a X_b$$

wherein T is a metal chosen from the group consisting of Groups IVa, Va, VIa, VIIa and period 4 of Group VIII; O is oxygen; $a$ is a number from 0 to 2; each X is any halogen; and $b$ is a number from 1 to 7.
2. The catalyst of claim 1 wherein in the formula:

$$MM'_v X_n R_y$$

M is a metal of Group IIb.

3. The catalyst of claim 1 wherein in the formula:

$$MM'_v X_n R_y$$

M is zinc, and each R is an alkyl group.

4. The catalyst of claim 1 wherein in the formula:

$$MM'_v X_n R_y$$

M is cadmium and each R is an alkyl group.

5. The catalyst of claim 1 wherein in the formula:

$$MM'_v X_n R_y$$

M is a metal of Group IIIb.

6. The catalyst of claim 1 wherein in the formula:

$$MM'_v X_n R_y$$

M is boron, $n$ is 0 and each R is an alkyl group.

7. The catalyst of claim 1 wherein in the formula:

$$MM'_v X_n R_y$$

M is thallium, $n$ is 0 and each R is an alkyl group.

8. The catalyst of claim 1 wherein in the formula:

$$MM'_v X_n R_y$$

M is indium, $n$ is 0 and each R is an alkyl group.

9. The catalyst of claim 1 wherein in the formula:

$$MM'_v X_n R_y$$

M is gallium, $n$ is 0 and each R is an alkyl group.

10. The catalyst of claim 1 wherein in the formula:

$$MM'_v X_n R_y$$

M is aluminum.

11. The catalyst of claim 1 wherein in the formula:

$$MM'_v X_n R_y$$

M is aluminum, $n$ is 0 and each R is an alkyl group.

12. The catalyst of claim 1 wherein in the formula:

$$MM'_v X_n R_y$$

M is aluminum, $v$ is 0, $n$ is 0 and each R is an alkyl group.

13. The catalyst of claim 1 wherein in the formula:

$$MM'_v X_n R_y$$

$v$ is 0, $n$ is 0 and each R is an alkyl group.

14. The catalyst of claim 1 wherein in the formula:

$$TO_a X_b$$

each X is chlorine.

15. The catalyst of claim 1 wherein said compound conforming to the formula:

$$TO_a X_b$$

is a compound of a metal of Group IVa.

16. The catalyst of claim 1 wherein said compound conforming to the formula:

$$TO_a X_b$$

is a compound of titanium.

17. The catalyst of claim 1 wherein said compound conforming to the formula:

$$TO_a X_b$$

is chosen from the group consisting of titanium tetrachloride, zirconium tetrachloride and titanium trichloride.

18. The catalyst of claim 1 wherein said compound conforming to the formula:

$$TO_a X_b$$

is titanium tetrachloride.

19. The catalyst of claim 1 wherein said compound conforming to the formula:

$$TO_a X_b$$

is a compound of a metal of Group Va.

20. The catalyst of claim 1 wherein said compound conforming to the formula:

$$TO_aX_b$$

is a compound of vanadium.

21. The catalyst of claim 1 wherein said compound conforming to the formula:

$$TO_aX_b$$

is a compound of a metal of Group VIa.

22. The catalyst of claim 1 wherein said carbon black has chemically linked thereto at least about $5 \times 10^{-4}$ equivalents per gram of structures conforming to the formula:

$$MM'_vX_nR_y$$

23. The catalyst of claim 1 wherein said carbon black is a channel black.

24. The catalyst of claim 1 wherein said carbon black is a furnace black.

25. A process for polymerizing a substance chosen from the group consisting of a mono-olefin, mixtures of mono-olefins, a di-olefin, mixtures of di-olefins, and mixtures thereof which comprises contacting said substance at temperatures between 25° C. and 250° C., with a catalyst comprising
(a) Carbon black having an average particle diameter of less than about 0.1 micron and having chemically linked directly to oxygen atoms in the surface thereof at least about $1 \times 10^{-4}$ equivalents per gram of structures conforming to the formula:

$$MM'_vX_nR_y$$

wherein M is chosen from the group consisting of the metals of Groups IIb and IIIb; M' is a metal of Group I; $v$ is a number from 0 to 1; each X is any halogen; $n$ is a number from 0 to 2; each R is chosen from the group consisting of hydride and monovalent hydrocarbon radicals; and $y$ is a number from 1 to 3; and
(b) a compound conforming to the general formula:

$$TO_aX_b$$

wherein T is chosen from the group consisting of the metals of groups IVa, Va, VIa, VIIa and period 4 of Group VIII; O is oxygen; $a$ is a number from 0 to 2; each X is any halogen; and $b$ is a number from 1 to 7.

26. The process of claim 25 wherein the substance polymerized is ethylene.

27. The process of claim 25 wherein the substance polymerized is propylene.

28. The process of claim 25 wherein the substance polymerized is butene-1.

29. The process of claim 25 wherein the substance polymerized is a di-olefin.

30. The process of claim 25 wherein in the formula:

$$MM'_vX_nR_y$$

M is aluminum; $v$ is 0; $n$ is 0; and each R is any alkyl group, and said compound conforming to the formula $TO_aX_b$ is a compound of Group IVa.

31. The process of claim 25 wherein the substance polymerized is titanium tetrachloride.

32. The process of claim 25 wherein said carbon black has chemically linked thereto at least about $5 \times 10^{-4}$ equivalents per gram of structures conforming to the formula:

$$MM'_vX_nR_y$$

No references cited.

JOSEPH L. SCHOFER, *Primary Examiner*.